(12) United States Patent
Narita et al.

(10) Patent No.: US 7,528,888 B2
(45) Date of Patent: May 5, 2009

(54) TELEVISION BROADCAST RECEIVER

(75) Inventors: Shusuke Narita, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 701 days.

(21) Appl. No.: 11/288,199

(22) Filed: Nov. 29, 2005

(65) Prior Publication Data

US 2006/0114353 A1 Jun. 1, 2006

(30) Foreign Application Priority Data

Nov. 29, 2004 (JP) .............................. 2004-343409

(51) Int. Cl.
*H04N 5/50* (2006.01)
(52) U.S. Cl. ...................... 348/570; 348/725
(58) Field of Classification Search ................. 348/570, 348/725, 726, 731, 552, 553; 342/359
See application file for complete search history.

(56) References Cited

U.S. PATENT DOCUMENTS

| | | | | |
|---|---|---|---|---|
| 5,430,769 A | * | 7/1995 | Patsiokas et al. ............ | 375/347 |
| 5,977,913 A | * | 11/1999 | Christ ........................ | 342/465 |
| 6,937,188 B1 | * | 8/2005 | Saunders et al. ............ | 342/359 |
| 6,967,694 B1 | * | 11/2005 | Ninomiya et al. ........... | 348/726 |
| 7,286,190 B2 | * | 10/2007 | Klopfenstein et al. ....... | 348/569 |
| 2004/0183947 A1 | * | 9/2004 | Lee ............................ | 348/570 |
| 2005/0089123 A1 | * | 4/2005 | Spiegel ...................... | 375/345 |
| 2005/0253973 A1 | * | 11/2005 | Adachi et al. ............... | 348/838 |
| 2007/0230403 A1 | * | 10/2007 | Douglas et al. ............. | 370/334 |

FOREIGN PATENT DOCUMENTS

| | | |
|---|---|---|
| JP | 2001-094899 A | 4/2001 |
| JP | 2004-179825 A | 6/2004 |

* cited by examiner

*Primary Examiner*—Paulos M Natnael
(74) *Attorney, Agent, or Firm*—Crowell & Moring LLP

(57) ABSTRACT

A television broadcast receiver determines the signal strength, the desired to undesired (D/U) ratio, the carrier to noise (C/N) ratio of a received television signal. Based on these values, the television broadcast receiver determines an overall evaluation value indicating the condition of reception of the television signal by reading a receiving condition evaluation table and determines a message explaining the condition of reception of the television signal by reading a message table. Then, the television broadcast receiver presents to a user the determined overall evaluation value and message along with the signal strength, the D/U ratio, and the C/N ratio. Accordingly, the user can easily make a judgment on whether the receiving condition is good or not based on the overall evaluation value.

4 Claims, 10 Drawing Sheets

FIG. 3A

Table 54: SIGNAL STRENGTH 70

| MULTI-PATH (D/U) \ INTERFERENCE (C/N) | 0 | 10 | 20 | 30 | 40 | 50 | 60 | 70 | 80 | 90 | 100 |
|---|---|---|---|---|---|---|---|---|---|---|---|
| 0 | 70 | 70 | 65 | 55 | 50 | 45 | 40 | 40 | 30 | 10 | 0 |
| 10 | 70 | 65 | 60 | 55 | 50 | 45 | 40 | 40 | 30 | 10 | 0 |
| 20 | 65 | 60 | 55 | 50 | 50 | 45 | 40 | 30 | 20 | 10 | 0 |
| 30 | 60 | 55 | 55 | 50 | 45 | 40 | 40 | 30 | 20 | 10 | 0 |
| 40 | 55 | 50 | 50 | 45 | 45 | 40 | 40 | 30 | 20 | 5 | 0 |
| 50 | 50 | 45 | 45 | 40 | 40 | 50 | 30 | 20 | 10 | 5 | 0 |
| 60 | 40 | 40 | 40 | 40 | 40 | 40 | 20 | 20 | 10 | 5 | 0 |
| 70 | 40 | 40 | 40 | 30 | 30 | 30 | 20 | 5 | 5 | 5 | 0 |
| 80 | 30 | 20 | 20 | 20 | 10 | 5 | 10 | 0 | 0 | 0 | 0 |
| 90 | 10 | 5 | 0 | 5 | 5 | 5 | 10 | 0 | 0 | 0 | 0 |
| 100 | 0 | 0 | 0 | 0 | 0 | 0 | 0 | 0 | 0 | 0 | 0 |

FIG. 3B

Table 55: SIGNAL STRENGTH 60

| MULTI-PATH (D/U) \ INTERFERENCE (C/N) | 0 | 10 | 20 | 30 | 40 | 50 | 60 | 70 | 80 | 90 | 100 |
|---|---|---|---|---|---|---|---|---|---|---|---|
| 0 | 60 | 60 | 55 | 55 | 50 | 45 | 40 | 40 | 30 | 10 | 0 |
| 10 | 60 | 55 | 55 | 50 | 50 | 45 | 40 | 40 | 30 | 10 | 0 |
| 20 | 55 | 55 | 50 | 50 | 45 | 45 | 40 | 30 | 20 | 10 | 0 |
| 30 | 55 | 50 | 45 | 45 | 45 | 40 | 40 | 30 | 20 | 10 | 0 |
| 40 | 50 | 45 | 50 | 45 | 45 | 40 | 40 | 30 | 20 | 5 | 0 |
| 50 | 45 | 45 | 45 | 40 | 40 | 50 | 30 | 20 | 10 | 5 | 0 |
| 60 | 40 | 40 | 40 | 40 | 40 | 40 | 20 | 20 | 10 | 5 | 0 |
| 70 | 40 | 40 | 40 | 30 | 30 | 30 | 20 | 5 | 5 | 5 | 0 |
| 80 | 30 | 20 | 20 | 20 | 10 | 5 | 5 | 0 | 0 | 0 | 0 |
| 90 | 10 | 5 | 0 | 5 | 5 | 5 | 5 | 0 | 0 | 0 | 0 |
| 100 | 0 | 0 | 0 | 0 | 0 | 0 | 0 | 0 | 0 | 0 | 0 |

FIG. 3C

Table 56: SIGNAL STRENGTH 50

| MULTI-PATH (D/U) \ INTERFERENCE (C/N) | 0 | 10 | 20 | 30 | 40 | 50 | 60 | 70 | 80 | 90 | 100 |
|---|---|---|---|---|---|---|---|---|---|---|---|
| 0 | 50 | 50 | 45 | 45 | 40 | 30 | 20 | 15 | 10 | 5 | 0 |
| 10 | 50 | 45 | 45 | 45 | 40 | 30 | 20 | 15 | 10 | 0 | 0 |
| 20 | 45 | 45 | 40 | 40 | 40 | 25 | 15 | 10 | 5 | 0 | 0 |
| 30 | 45 | 40 | 40 | 40 | 35 | 15 | 15 | 10 | 5 | 0 | 0 |
| 40 | 40 | 40 | 30 | 30 | 35 | 15 | 10 | 5 | 5 | 0 | 0 |
| 50 | 30 | 25 | 20 | 15 | 15 | 10 | 10 | 5 | 5 | 5 | 0 |
| 60 | 20 | 15 | 15 | 10 | 10 | 5 | 5 | 0 | 0 | 0 | 0 |
| 70 | 15 | 10 | 10 | 5 | 5 | 5 | 0 | 0 | 0 | 0 | 0 |
| 80 | 10 | 10 | 5 | 5 | 5 | 0 | 0 | 0 | 0 | 0 | 0 |
| 90 | 5 | 5 | 0 | 0 | 0 | 0 | 0 | 0 | 0 | 0 | 0 |
| 100 | 0 | 0 | 0 | 0 | 0 | 0 | 0 | 0 | 0 | 0 | 0 |

| A | "RECEIVING CONDITION IS OPTIMUM." | ~61 |
|---|---|---|
| B | "THERE ARE SOMEWHAT LARGE EFFECTS OF MULTIPATH." | ~62 |
|   | "CHANGING ANTENNA DIRECTION CAN IMPROVE RECEIVING CONDITION." | ~71 |
| C | "THERE IS SOMEWHAT LARGE INTERFERENCE IMPAIRMENT." | ~63 |
|   | "USE ANTENNA WITH HIGH DIRECTIVITY." | ~72 |
| D | "IMAGE CANNOT BE RECEIVED DUE TO GREAT EFFECTS OF MULTIPATH." | ~64 |
|   | "CHANGE ANTENNA DIRECTION TO CHECK RECEPTION OF IMAGE." | ~73 |
| E | "IMAGE CANNOT BE RECEIVED DUE TO GREAT INTERFERENCE IMPAIRMENT." | ~65 |
|   | "USE ANTENNA WITH HIGH NOISE IMMUNITY." | ~74 |
| F | "RECEIVING CONDITION IS VERY POOR. IT IS UNLIKELY THAT RECEPTION OF IMAGE WILL BE MADE POSSIBLE." | ~66 |
| G | "SIGNAL STRENGTH IS SOMEWHAT LOW." | ~67 |
| H | "IMAGE CANNOT BE RECEIVED DUE TO LOW SIGNAL STRENGTH." | ~68 |

TELEVISION BROADCAST RECEIVER

BACKGROUND OF THE INVENTION

1. Field of the Invention

The present invention relates to a television broadcast receiver.

2. Description of the Related Art

Television (TV) broadcast receivers are known in the art that are configured to determine, for example, the signal strength and the carrier to noise (C/N) ratio of a TV signal received via an antenna and present the condition of reception of the TV signal to a user (see e.g. Japanese laid-open patent publication Nos. 2001-94899 and 2004-179825). Such a TV broadcast receiver enables a user to adjust the antenna properly in accordance with the condition of reception of a TV signal. According to the ATSC A/74 standard, it is required that the effects of multipath and interference impairment as well as the signal strength should be presented to a user in a way easy to understand.

However, whether the condition of reception of a TV signal is good or poor depends on the signal strength, multipath effects, interference impairment, and so on that affect each other. Accordingly, when the signal strength, multipath effects, interference impairment, and so on are merely presented, it may be difficult for a user to judge the condition of reception of the TV signal in a comprehensive manner.

SUMMARY OF THE INVENTION

An object of the present invention is to provide a TV broadcast receiver that enables a user to easily make a judgment on the condition of reception of a TV signal.

According to an aspect of the present invention, a television broadcast receiver comprises: a tuner that receives a television signal; signal strength detecting means for detecting a strength of the television signal received by the tuner; desired to undesired (D/U) ratio determining means for determining a D/U ratio of the television signal received by the tuner to detect multipath effects; carrier to noise (C/N) ratio determining means for determining a C/N ratio of the television signal received by the tuner to detect interference impairment; received signal quality informing means for presenting information on a quality of the television signal received by the tuner to a user; receiving condition evaluation table storage means for storing a receiving condition evaluation table used for overall evaluation of a condition of the reception of the television signal received by the tuner, the receiving condition evaluation table containing an overall evaluation value, indicating a condition of reception of a television signal, for each combination of a signal strength, a D/U ratio, and a C/N ratio; and overall evaluation value determining means for reading the receiving condition evaluation table to determine an overall evaluation value for the television signal received by the tuner based on the signal strength detected by the signal strength detecting means, the D/U ratio determined by the D/U ratio determining means, and the C/N ratio determined by the C/N ratio determining means, wherein the received signal quality informing means presents the overall evaluation value determined by the overall evaluation value determining means to the user.

With the above configuration, an overall evaluation value indicating the condition of reception of a television signal is determined based on the signal strength detected by the signal strength detecting means, the D/U ratio determined by the D/U ratio determining means, and the C/N ratio determined by the C/N ratio determining means by reading the receiving condition evaluation table. Then, the determined overall evaluation value is presented to a user. Accordingly, the user can easily make a judgment on whether the condition of the reception of the television signal is good or not.

Preferably, the received signal quality informing means presents, to the user, the overall evaluation value determined by the overall evaluation value determining means along with the signal strength detected by the signal strength detecting means, the D/U ratio determined by the D/U ratio determining means, and the C/N ratio determined by the C/N ratio determining means. With this configuration, the signal strength, the D/U ratio, and the C/N ratio of a television signal received is presented to a user along with the overall evaluation value for the received television signal. Accordingly, the user can know the condition of the reception of the television signal in more detail and thus make a judgment on the receiving condition more easily.

Preferably, the television broadcast receiver further comprises: message table storage means for storing a message table containing a plurality of messages for providing a user with an explanation about a condition of reception of a television signal and/or how to improve the receiving condition, each of the messages corresponding to a combination of a signal strength, a D/U ratio, and a C/N ratio in the receiving condition evaluation table; and message determining means for reading the message table to determine a message corresponding to the condition of the reception of the television signal received by the tuner based on the signal strength detected by the signal strength detecting means, the D/U ratio determined by the D/U ratio determining means, and the C/N ratio determined by the C/N ratio determining means, wherein the received signal quality informing means updates and presents to the user the signal strength, the D/U ratio, and the C/N ratio of the television signal received by the tuner in sync with each other, and presents to the user the overall evaluation value determined by the overall evaluation value determining means and the message determined by the message determining means.

With the above configuration, the signal strength, the D/U ratio, and the C/N ratio of the received television signal that are updated in sync with each other are presented to the user as well as the overall evaluation value for the received television signal. Accordingly, the user can know the condition of the reception of the television signal in more detail and thus make a judgment on the receiving condition more easily.

Further, a message is presented to the user for providing the user with an explanation about the television signal receiving condition and/or how to improve the receiving condition in addition to the overall evaluation value, the signal strength, the D/U ratio, and the C/N ratio of the received television signal. Accordingly, the user can not only make a judgment on the receiving condition more easily but also know how to improve the receiving condition.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIGS. 3A, 3B, and 3C are schematic diagrams of receiving condition evaluation tables where signal strengths are "70", "60", and "50", respectively;

FIG. 4 is a schematic diagram of a message table stored in the memory in the TV broadcast receiver;

DESCRIPTION OF THE PREFERRED EMBODIMENT

Referring now to the accompanying drawings, the preferred embodiments of the present invention are described. It is to be noted that the following description of preferred embodiments of the present invention has been presented for purposes of illustration and description, and is not intended to be exhaustive or to limit the present invention to the precise form disclosed.

Figure 1:
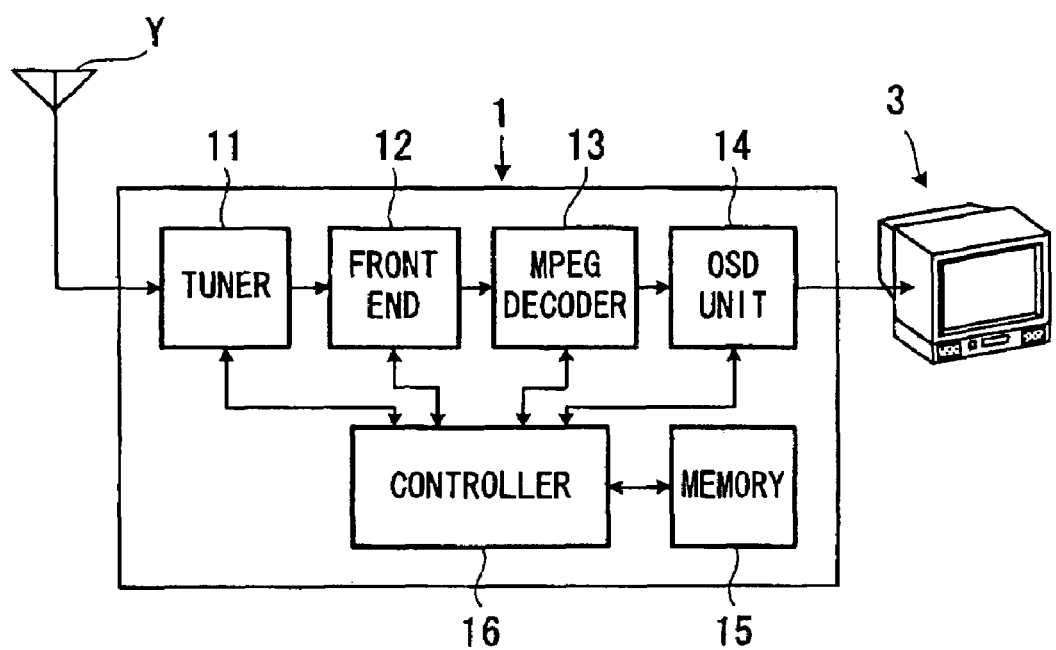
FIG. 1 is a block diagram showing the configuration of a TV broadcast receiver according to a first embodiment of the present invention.

Referring to FIG. 1 to FIG. 6, a television (TV) broadcast receiver according to a first embodiment of the present invention is described. As shown in FIG. 1, the TV broadcast receiver 1 is an apparatus that is connected to a Yagi antenna Y or the like to receive a digital TV signal (hereinafter, referred to simply as "TV signal") transmitted in a given frequency band from a broadcast station and output a TV program contained in TV signals on each channel to a monitor 3. It is to be noted that a physical channel, which is a frequency band of carrier wave used for broadcasting a TV program, is herein referred to simply as "channel".

The TV broadcast receiver 1 comprises a tuner 11, a front end 12 for subjecting a TV signal received by the tuner 11 to predetermined signal processing to decode the TV signal, an MPEG decoder 13 for decoding an MPEG-compressed TV signal, an on-screen display (OSD) unit 14 for superimposing predetermined image data on a decoded TV signal, a memory 15 for storing various kinds of information, and a controller 16 for controlling each component in the TV broadcast receiver 1.

The tuner 11 receives TV signals via the Yagi antenna Y and selects a signal on a desired channel from among the received TV signals. The front end 12 (signal strength detecting means, desired to undesired (D/U) ratio determining means, and carrier to noise (C/N) ratio determining means) includes an analog to digital (A/D) converter, a waveform equalization circuit, a C/N determining circuit, and an error correcting circuit. The front end 12 determines the signal strength, the D/U ratio, and the C/N ratio of a TV signal for output to the controller 16. Further, the front end 12 performs an error correction and separates required transport stream (TS) packets from multiplexed signals to supply the required TS packets to the respective blocks in the TV broadcast receiver 1. The MPEG decoder 13 decodes video stream separated by the front end 12 and outputs the decoded video signal via the OSD unit 14 to the monitor 3.

Figure 2A:
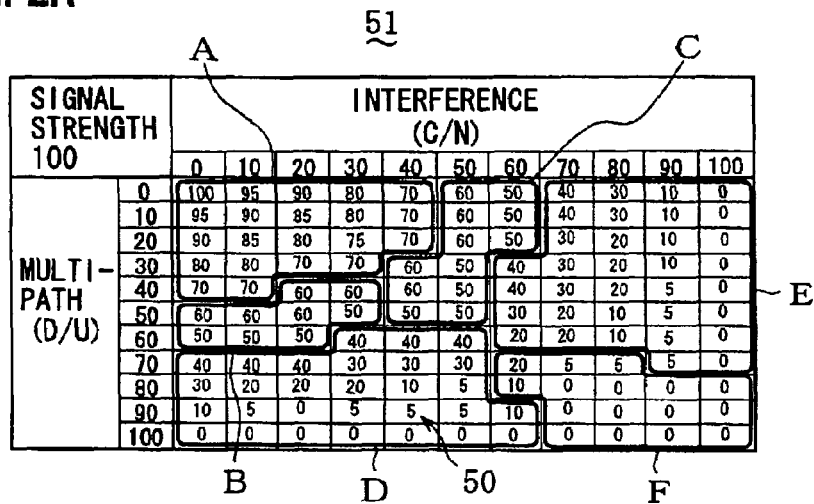
FIGS. 2A, 2B, and 2C are schematic diagrams of receiving condition evaluation tables stored in a memory in the TV broadcast receiver where signal strengths are "100", "90", and "80", respectively.
Figure 2B:
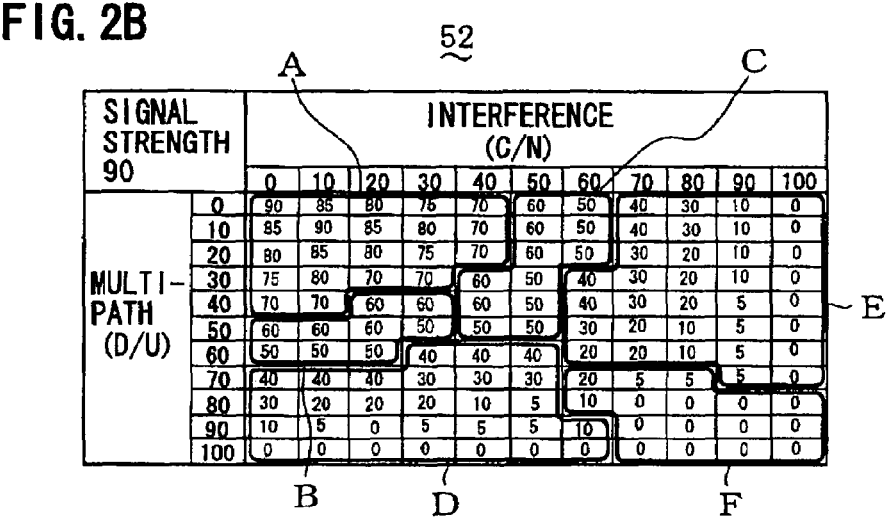
Figure 2C:
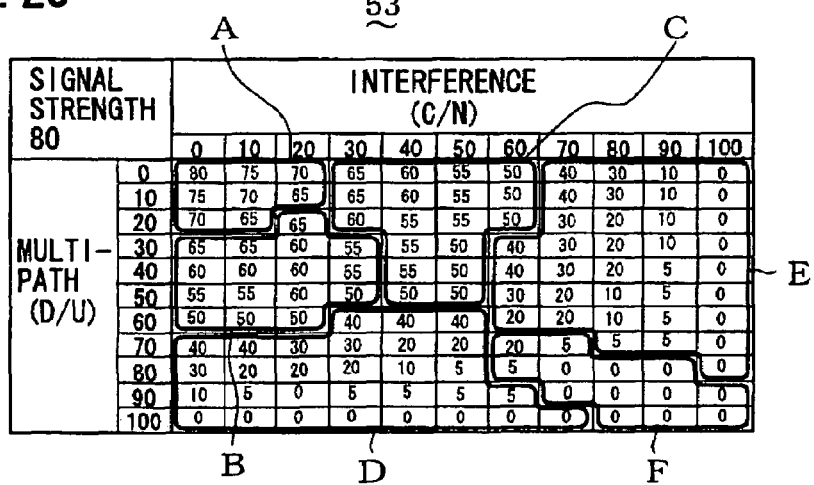

The memory 15 (receiving condition evaluation table storage means) stores receiving condition evaluation tables 51 to 56 as shown in FIG. 2 and FIG. 3. The receiving condition evaluation tables 51 to 56 are used for overall evaluation of the condition of the reception of a TV signal received by the tuner 11, in which an overall evaluation value 50 indicating the condition of reception of a TV signal is contained for each combination of signal strength, D/U ratio, and C/N ratio. Each of the receiving condition evaluation tables 51 to 56 is divided into ranges A to G depending on the TV signal receiving condition. It is to be noted that, in FIGS. 2 and 3, the values of signal strength, D/U ratio, and C/N ratio are each expressed as a percentage "0" to "100" for convenience. The percentage "100" corresponds to the highest signal strength, the greatest effects of multipath (the lowest D/U ratio), or the greatest interference impairment (the lowest C/N ratio) while the percentage "0" corresponds to the lowest signal strength, the least effects of multipath (the highest D/U ratio), or the least interference impairment (the highest C/N ratio).

For example, referring to FIG. 2 and FIG. 3, in the case where the value of signal strength is "90" (see FIG. 2B), the value of D/U ratio is "40", and the value of C/N ratio is "30", the overall evaluation value 50 is "60", which belongs to the range B. In the case where the value of signal strength is "70" (see FIG. 3A), the value of D/U ratio is "70", and the value of C/N ratio is "10", the overall evaluation value 50 is "40", which belongs to the range D.

The memory 15 (message table storage means) further stores a message table 60 as shown in FIG. 4. The message table 60 contains messages 61 to 68 each explaining the condition of reception of a TV signal and messages 69 to 72 for advising a user of how to improve the receiving condition, which messages correspond to the combinations of signal strengths, D/U ratios, and C/N ratios in the receiving condition evaluation tables 51 to 56. Each of the messages 61 to 72 shown in FIG. 4 corresponds to one of the ranges A to G shown in FIGS. 2 and 3. For example, the message 61 corresponds to the combinations of signal strengths, D/U ratios, and C/N ratios that are belong to the range A. The messages 62 and 69 correspond to the combinations of the three values that belong to the range B. Likewise, the messages 63 and 70, the messages 64 and 71, and the messages 65 and 72 correspond to the ranges C, D, and E, respectively, and the message 66 and the message 67 correspond to the range F and G, respectively. In FIG. 4, the message 66 is a message used in the case where the condition of reception of a TV signal is poor due to two or more factors. The message 68 is a message used in the case where the value of signal strength is smaller than or equal to "40". In this embodiment, a receiving condition evaluation table is not provided for the case where the value of signal strength is smaller than or equal to "40", considering that such a low signal strength prohibits image receiving, but a receiving condition evaluation table may be provided for the case where the value of signal strength is "40" or less. Further, overall evaluation values 50 may be calculated using a predetermined arithmetic expression (e.g., $x=a-(b+c)/2$, in which "x", "a", "b", and "c" represent an overall evaluation value, the value of signal strength, the value of D/U ratio, and the value of C/N ratio, respectively).

The controller 16 performs various processes in accordance with programs stored in a ROM (not shown) and controls the entire TV broadcast receiver 1. The controller 16 serves as overall evaluation value determining means, message determining means, and received signal quality informing means by performing a process of presenting receiving condition information, which is described below.

Figure 5:
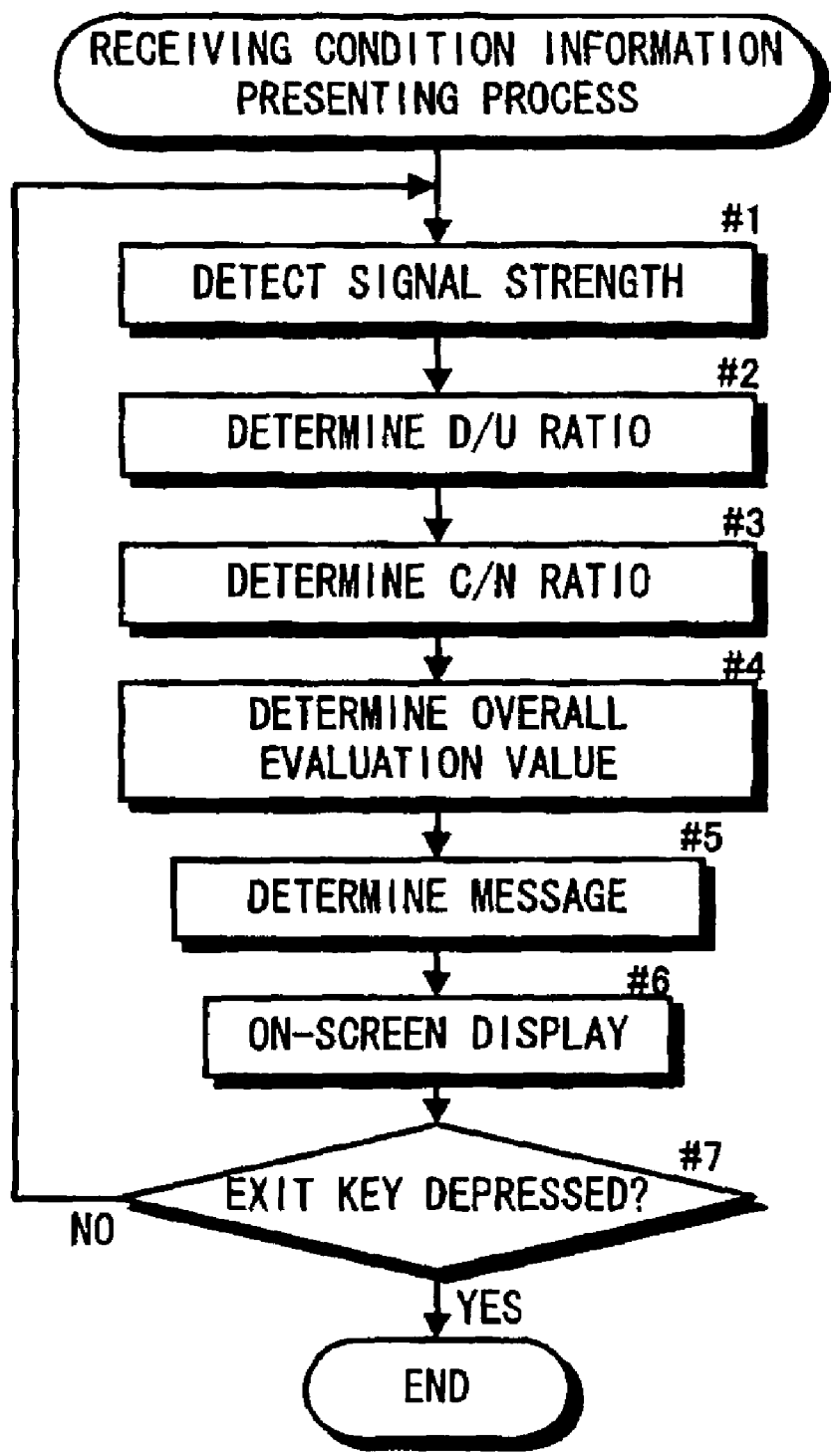
FIG. 5 is a flowchart showing a process of presenting receiving condition information that is performed by the TV broadcast receiver.

Referring now to the flowchart of FIG. 5, the receiving condition information presenting process by the TV broadcast receiver 1 is described. When the receiving condition information presenting process is started, the front end 12 of the TV broadcast receiver 1 determines the signal strength, the D/U ratio, and the C/N ratio, in sequence, of a received TV signal (#1 to #3), and outputs the determined signal strength, D/U ratio, and C/N ratio to the controller 16. Based on the signal strength, the D/U ratio, and the C/N ratio received from the front end 12, the controller 16 determines an overall evaluation value 50 for the received TV signal by reading the receiving condition evaluation tables 51 to 56 (#4). Then, based on the signal strength, the D/U ratio, and the C/N ratio, the controller 16 determines one (or two) of the messages 61 to 72 that corresponds to the condition of the reception of the TV signal by reading the message table 60 (#5). Subsequently, the controller 16 controls the OSD unit 14 to display the signal strength, the D/U ratio, and the C/N ratio along with the overall evaluation value 50 and the message (messages) determined at the steps #4 and #5 for presenting to a user (#6). Until the user operates a key (not shown) for exiting the receiving condition information presenting process (YES at #7), the signal strength, the D/U ratio, and the C/N ratio is updated and presented to the user in sync with each other. This means that the values of signal strength, D/U ratio, and C/N ratio are updated and presented at the same time. More particularly, in general, the signal strength, the D/U ratio, and the C/N ratio cannot be determined all at once but need to be determined individually. However, the three values are presented to the user not separately just after the respective values are determined but at once after all of the three values are determined. By updating and presenting to the user the signal strength, the D/U ratio, and the C/N ratio in sync with each other, the user is allowed to easily check the condition of reception of a TV signal.

Figure 6:
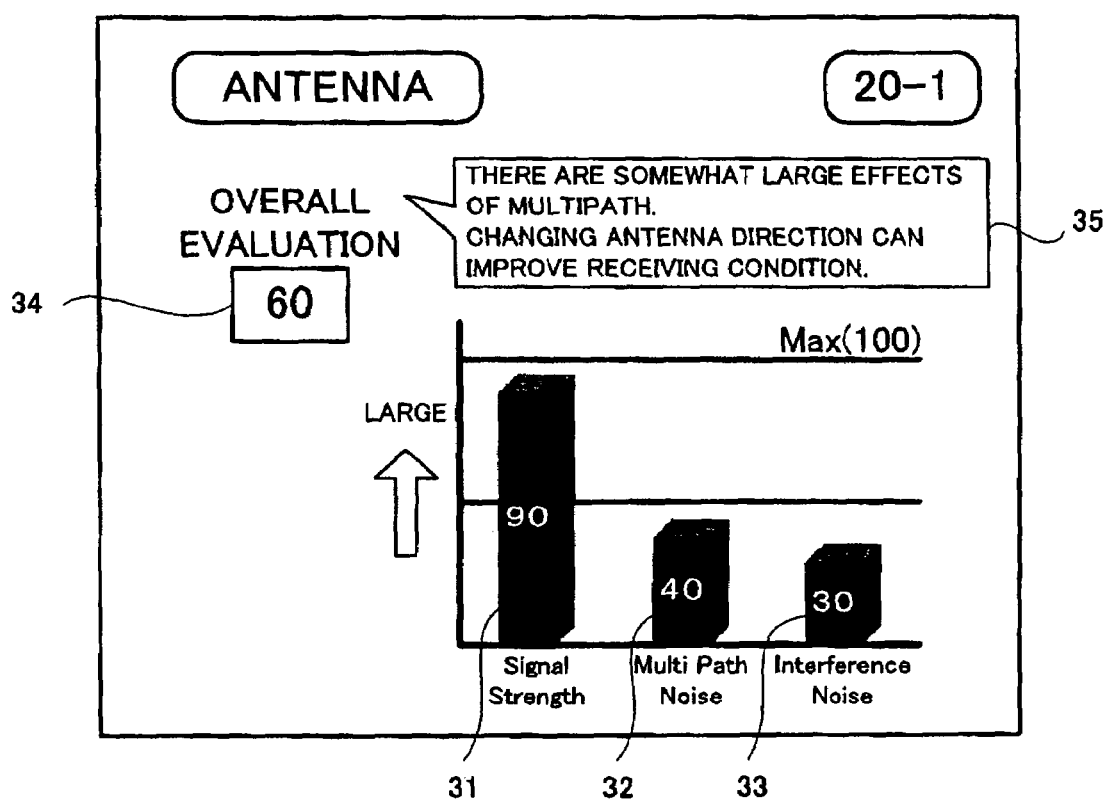
FIG. 6 shows a receiving condition screen displayed in the receiving condition information presenting process.

FIG. 6 shows an example of a receiving condition screen 30 that is displayed in the receiving condition information presenting process described above. The receiving condition screen 30 contains a bar graph 31 for representing the signal strength of a received TV signal, a bar graph 32 for representing the D/U ratio, and a bar graph 33 for representing the C/N ratio along with an overall evaluation value display portion 34 and a message window 35. The screen shown in FIG. 6 is for the case where the value of signal strength is "90", the value of D/U ratio is "40", and the value of C/N ratio is "30", in which displayed are the value "60" as the overall evaluation value 50 that has been determined by reading the receiving condition evaluation table 52 shown in FIG. 2B as well as the messages 62 and 69 corresponding to the range B that are determined by reading the message table 60 shown in FIG. 4.

As described above, the TV broadcast receiver 1 according to this embodiment reads the receiving condition evaluation tables 51 to 56 to determine an overall evaluation value 50 indicating the condition of reception of a TV signal based on the signal strength, the D/U ratio, and the C/N ratio of the TV signal that are determined at the front end 12, and presents the overall evaluation value 50 to a user. This allows the user to easily make a judgment on whether the condition of reception of the TV signal is good or not.

Further, the TV broadcast receiver 1 updates and presents to a user the signal strength, the D/U ratio, and the C/N ratio of a received TV signal in sync with each other as well as the overall evaluation value 50 for the TV signal. Accordingly, the user is allowed to know the condition of reception of the TV signal in more detail so as to judge the receiving condition more easily.

Moreover, the TV broadcast receiver 1 presents to a user messages 61 to 72 for providing the user with explanations about the condition of reception of a TV signal and/or how to improve the receiving condition as well as the overall evaluation value 50, the signal strength, the D/U ratio, and the C/N ratio of the received TV signal. Accordingly, the user can not only easily make a judgment on the receiving condition but also know how to improve the receiving condition.

Referring now to FIG. 7 to FIG. 10, a TV broadcast receiver according to a second embodiment of the present invention is described. The TV broadcast receiver 1 according to this embodiment is different from the first embodiment in that it is connected to a multi-directional antenna that can change the directivity so as to control the directivity of the antenna. It is to be noted that the multi-directional antenna refers to an antenna that allows the directivity to be switched by mechanical or electronic means. For example, an antenna as defined in the EIA-909 (Antenna Control Interface) standard, which is called "smart antenna", can be used as the multi-directional antenna.

Figure 7:
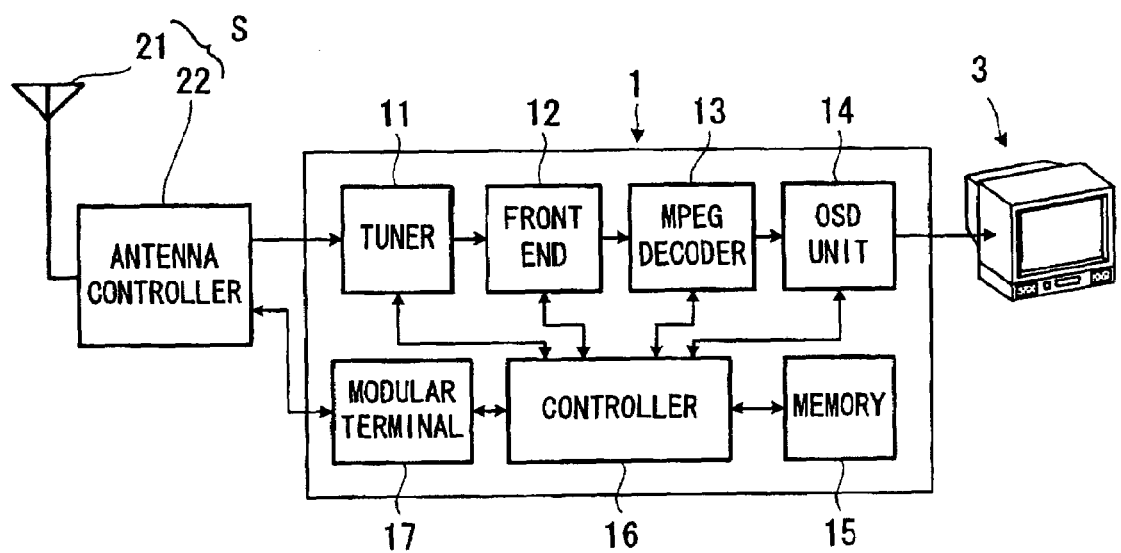
FIG. 7 is a block diagram showing the configuration of a TV broadcast receiver according to a second embodiment of the present invention.
Figure 8:
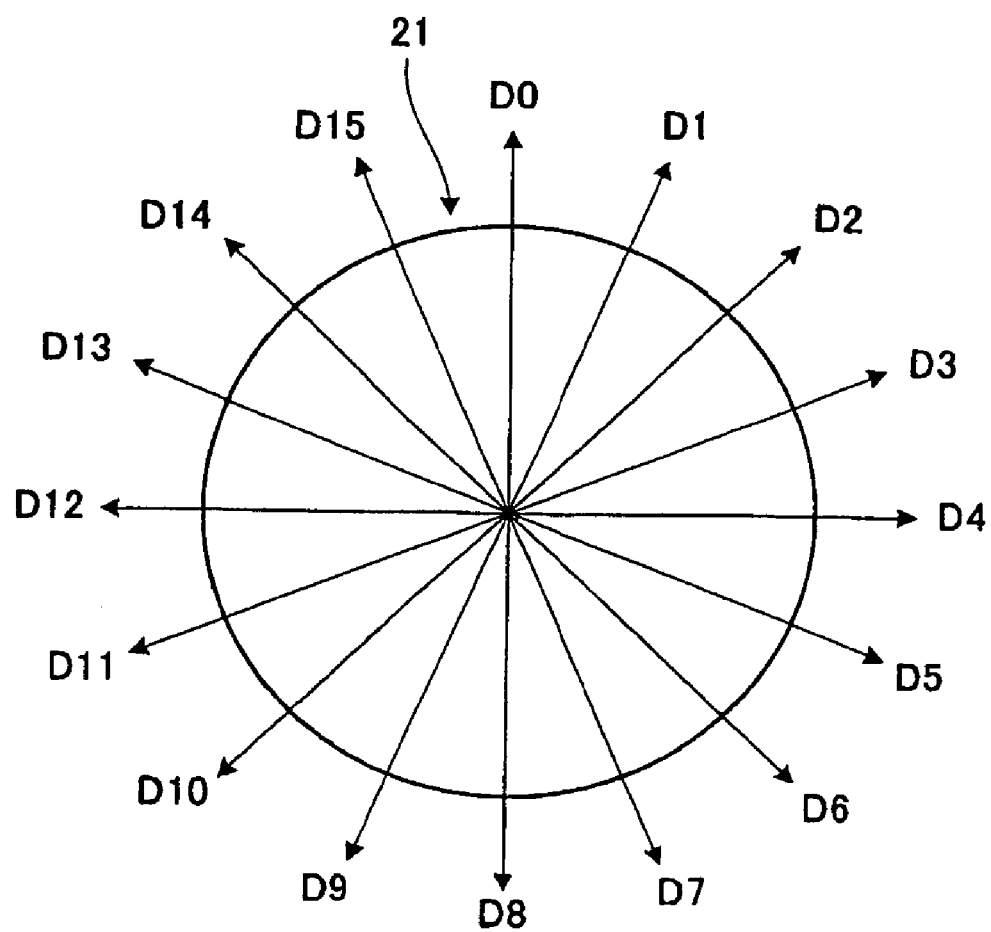
FIG. 8 is a schematic diagram showing directions from which a smart antenna to be connected to the TV broadcast receiver receives TV signals.

As shown in FIG. 7, a smart antenna S comprises an antenna unit 21 that receives TV signals from multiple directions D0 to D15 (see FIG. 8) by switching an active receiving direction mechanically or electronically and an antenna controller 22 that controls the operation of the antenna unit 21. In response to a control signal sent from the TV broadcast receiver 1, the antenna controller 22 causes only a designated one of the multiple receiving directions D0 to D15 of the antenna unit 21 to be active.

The TV broadcast receiver 1 has a modular terminal 17 to be connected to the antenna controller 22 so that the controller 16 outputs a control signal via the modular terminal 17 to the antenna controller 22 to control, for example, the active receiving direction of the smart antenna S.

Figure 9:
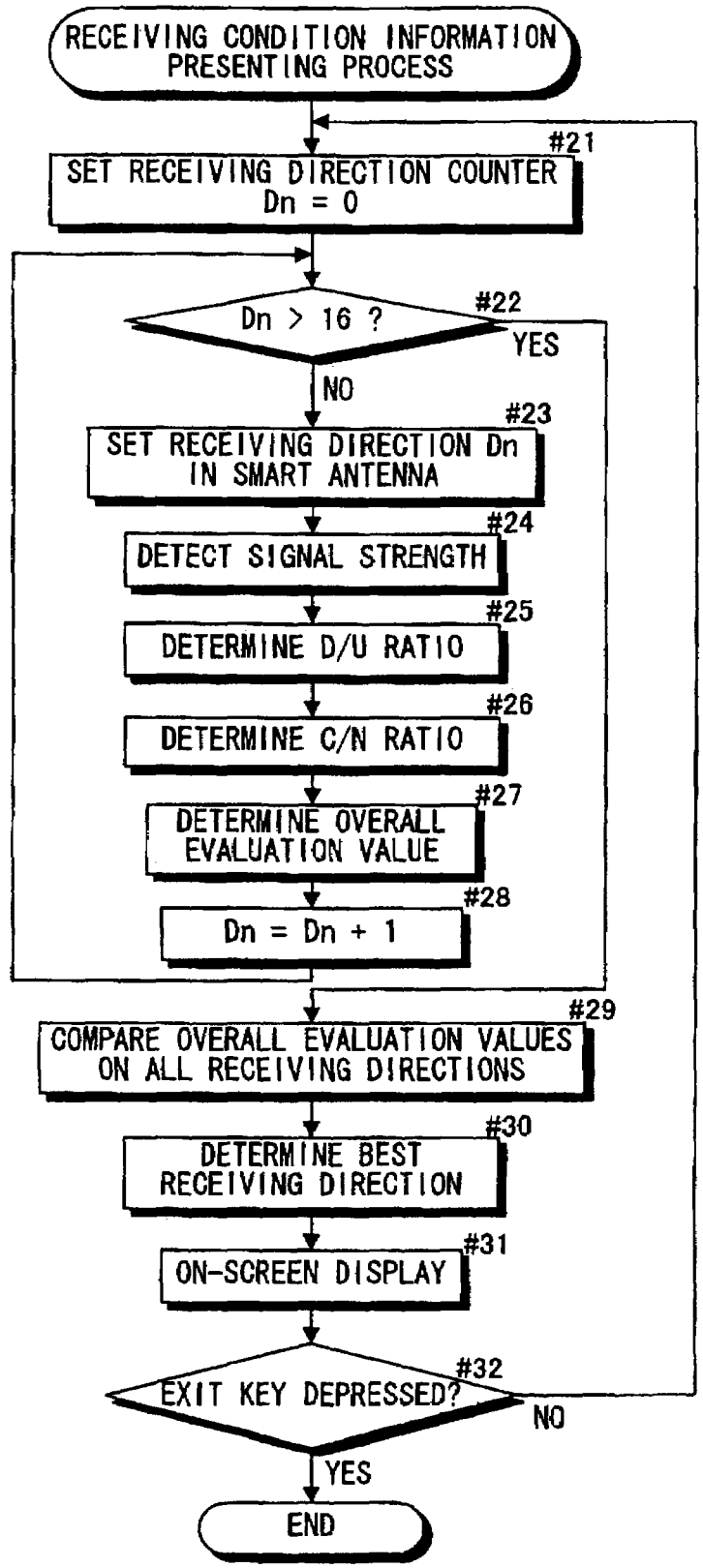
FIG. 9 is a flowchart showing a process of presenting receiving condition information that is performed by the TV broadcast receiver.

Referring now to FIG. 9, a process of presenting receiving condition information by the TV broadcast receiver 1 according to this embodiment is described. When the receiving condition information presenting process is started, the controller 16 first sets the value of receiving direction Dn to zero (#21). Then, the controller 16 determines whether or not the value of receiving direction Dn is larger than 16 (#22) and repeats the process of steps #23 to #28 for every receiving direction Dn. More particularly, first at the step #23, the controller 16 outputs a control signal to the antenna controller 22 to set the receiving direction Dn as the active receiving direction of the smart antenna S. The controller 16 then determines the signal strength, the D/U ratio, and the C/N ratio for the receiving direction Dn (#24, #25, and #26). Based on these values, the controller 16 determines an overall evaluation value 50 by reading receiving condition evaluation tables 51 to 56 as shown in FIGS. 2 and 3 (#27). Thereafter, the controller 16 increments the value of receiving direction Dn (#28), and repeats the process from the step #22. When the process of the steps #23 to #28 is completed for every receiving direction Dn (YES at #22), the controller 16 compares the overall evaluation values 50 on all the receiving directions (#29) and determines a receiving direction with the largest overall evaluation value 50 as a best receiving direction (#30). The controller 16 then controls the OSD unit 14 to display the signal strength, the D/U ratio, and the C/N ratio along with the overall evaluation value 50 for the best receiving direction (#31). Until a user operates a key for exiting the receiving condition information presenting process (YES at #32), the controller 16 updates and presents to the user the signal strength, the D/U ratio, and the C/N ratio in sync with each other.

Figure 10:
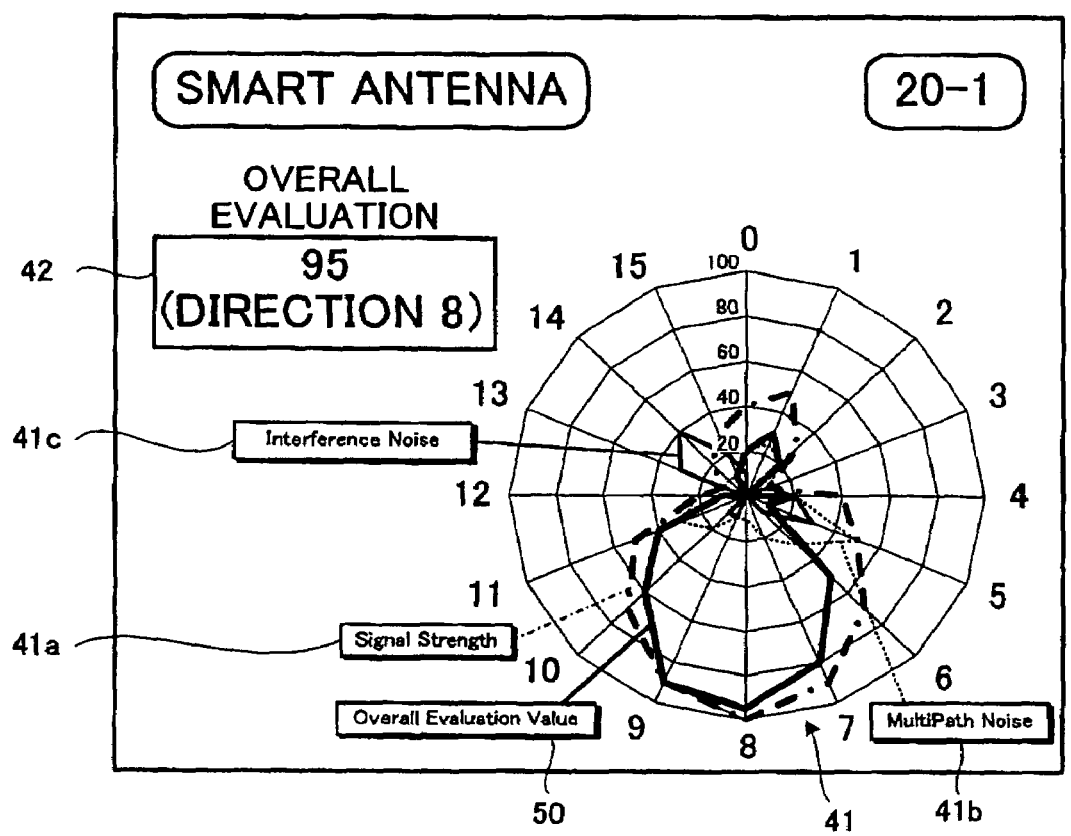
FIG. 10 shows a receiving condition screen displayed in the receiving condition information presenting process.

FIG. 10 shows an example of a receiving condition screen 40 displayed in the receiving condition information presenting process. The receiving condition screen 40 contains a graph 41 that shows the signal strength 41*a*, the D/U ratio 41*b*, the C/N ratio 41*c*, and the overall evaluation value 50 of a TV signal received from each of the receiving directions D0 to D15 and an overall evaluation value display portion 42 that shows the overall evaluation value 50 for the best receiving direction. By presenting in the form of the graph 41 the signal strength 41*a*, the D/U ratio 41*b*, the C/N ratio 41*c*, and the overall evaluation value 50 of the TV signal received from each of the receiving directions D0 to D15, it becomes easy for a user to intuitively understand the TV signal receiving condition for each of the receiving directions D0 to D15.

As described above, the TV broadcast receiver 1 according to this embodiment reads the receiving condition evaluation tables 51 to 56 to determine an overall evaluation value 50 indicating the condition of reception of a TV signal based on the signal strength, the D/U ratio, and the C/N ratio of the TV signal that are determined at the front end 12, and presents the overall evaluation Value 50 to a user, like the first embodiment. This allows the user to easily make a judgment on whether the condition of reception of the TV signal is good or not.

Further, the TV broadcast receiver 1 according to this embodiment can determine a best receiving direction by comparing the overall evaluation values 50 for the respective receiving directions D0 to D15. This can eliminate the necessity for a user to adjust the receiving direction of the smart antenna S by automatically controlling the smart antenna S to make the best receiving direction active, thereby enhancing the usability.

The present invention has been described above using a presently preferred embodiment, but those skilled in the art will appreciate that various modifications are possible. Accordingly, all such modifications are intended to be included within the spirit and scope of the present invention. For example, a TV signal to be received by the TV broadcast receiver according to the present invention is not limited to a digital TV signal but can be an analog TV signal. The receiving condition information presenting process can be designed to display only the overall evaluation value 50 so as to present information on the quality of a received TV signal to a user in a simple way.

This application is based on Japanese patent application 2004-343409 filed Nov. 29, 2004, the contents of which are hereby incorporated by reference.

What is claimed is:

1. A television broadcast receiver comprising:
    a tuner that receives a television signal;
    signal strength detecting means for detecting a strength of the television signal received by the tuner;
    desired to undesired (D/U) ratio determining means for determining a D/U ratio of the television signal received by the tuner to detect multipath effects;
    carrier to noise (C/N) ratio determining means for determining a C/N ratio of the television signal received by the tuner to detect interference impairment;
    received signal quality informing means for presenting information on a quality of the television signal received by the tuner to a user;
    receiving condition evaluation table storage means for storing a receiving condition evaluation table used for overall evaluation of a condition of the reception of the television signal received by the tuner, the receiving condition evaluation table containing an overall evaluation value, indicating a condition of reception of a television signal, for each combination of a signal strength, a D/U ratio, and a C/N ratio; and
    overall evaluation value determining means for reading the receiving condition evaluation table to determine an overall evaluation value for the television signal received by the tuner based on the signal strength detected by the signal strength detecting means, the D/U ratio determined by the D/U ratio determining means, and the C/N ratio determined by the C/N ratio determining means,
    wherein the received signal quality informing means presents the overall evaluation value determined by the overall evaluation value determining means to the user.

2. The television broadcast receiver according to claim 1, wherein the received signal quality informing means presents, to the user, the overall evaluation value determined by the overall evaluation value determining means along with the signal strength detected by the signal strength detecting means, the D/U ratio determined by the D/U ratio determining means, and the C/N ratio determined by the C/N ratio determining means.

3. The television broadcast receiver according to claim 1, wherein the received signal quality informing means presents, to the user, the signal strength detected by the signal strength detecting means, the D/U ratio determined by the D/U ratio determining means, and the C/N ratio determined by the C/N ratio determining means.

4. The television broadcast receiver according to claim 3, further comprising:
    message table storage means for storing a message table containing a plurality of messages for providing a user with an explanation about a condition of reception of a television signal and/or how to improve the receiving condition, each of the messages corresponding to a combination of a signal strength, a D/U ratio, and a C/N ratio in the receiving condition evaluation table; and
    message determining means for reading the message table to determine a message corresponding to the condition of the reception of the television signal received by the tuner based on the signal strength detected by the signal strength detecting means, the D/U ratio determined by the D/U ratio determining means, and the C/N ratio determined by the C/N ratio determining means,
    wherein the received signal quality informing means updates and presents to the user the signal strength, the D/U ratio, and the C/N ratio of the television signal received by the tuner in sync with each other, and presents to the user the overall evaluation value determined by the overall evaluation value determining means and the message determined by the message determining means.

* * * * *